United States Patent [19]
Claeyssen et al.

[11] Patent Number: 6,147,436
[45] Date of Patent: Nov. 14, 2000

[54] PIEZOACTIVE MOTOR BASED ON INDEPENDENT STATOR MODULES

[75] Inventors: Frank Claeyssen, Meylan; Ronan Le Letty, Grenoble; Nicolas Lhermet, Meylan, all of France

[73] Assignee: Cedrat-Recherche, Meylan, France

[21] Appl. No.: 09/202,430

[22] PCT Filed: Jun. 25, 1997

[86] PCT No.: PCT/FR97/01135

§ 371 Date: Dec. 15, 1998

§ 102(e) Date: Dec. 15, 1998

[87] PCT Pub. No.: WO97/50134

PCT Pub. Date: Dec. 31, 1997

[30] Foreign Application Priority Data

Jun. 27, 1996 [FR] France ................................. 96 08240

[51] Int. Cl.$^7$ .................................................. H01L 41/08
[52] U.S. Cl. ........................................................ 310/323.02
[58] Field of Search ............................... 310/328, 323.02, 310/323.16

[56] References Cited

U.S. PATENT DOCUMENTS

| | | | |
|---|---|---|---|
| 4,950,135 | 8/1990 | Tojo et al. | 310/323.02 |
| 5,424,597 | 6/1995 | Gloss et al. | 310/328 |

FOREIGN PATENT DOCUMENTS

| | | |
|---|---|---|
| 0 313 072 A1 | 4/1989 | European Pat. Off. . |
| 2 564 912 A3 | 11/1985 | France . |
| 0156283 | 8/1985 | Japan .................. 310/323.02 |
| 0039477 | 2/1988 | Japan .................. 310/323.02 |
| 0039478 | 2/1988 | Japan .................. 310/323.02 |
| 0146967 | 6/1990 | Japan .................. 310/323.02 |
| 0146968 | 6/1990 | Japan .................. 310/323.02 |
| 1053190 | 11/1983 | U.S.S.R. ............... 310/323.02 |

OTHER PUBLICATIONS

Patent Abstracts of Japan, vol. 009, No. 325 (E–368), Dec. 20, 1985, Publication No. JP–A–60156283.

Patent Abstracts of Japan, vol. 12, No. 254 (E–634), Jul. 16, 1988, Publication No. 63039478.

*Primary Examiner*—Mark O. Budd
*Attorney, Agent, or Firm*—Oliff & Berridge, PLC

[57] ABSTRACT

A piezoactive motor has a stator equipped with independent stator modules 44, each comprising at least one pair of longitudinal piezoactive actuators 12, 14 colinearly arranged inside a mechanical coupling element 16 in the form of a shell 20. In addition, it is fixed by flexible decoupling links 68, 70 and comprises a central countermass 18. To produce a closed trajectory of the peaks (A and B) designed to cause by friction relative movement of a driven part over a large travel distance, and to position the driven part, these modules use separately or in combination:

- translational deformation, obtained when the piezoactive actuators are deformed in opposition and produce a tangential movement of the peaks (A and B) of the shell (20) relatively to the countermass (18), due to the mass ratio between the countermass and the shell,
- flexional deformation, obtained when the piezoactive actuators are deformed in the same way and produce a flexion of the shell (20), resulting in a normal movement of the peaks A and B.

18 Claims, 17 Drawing Sheets

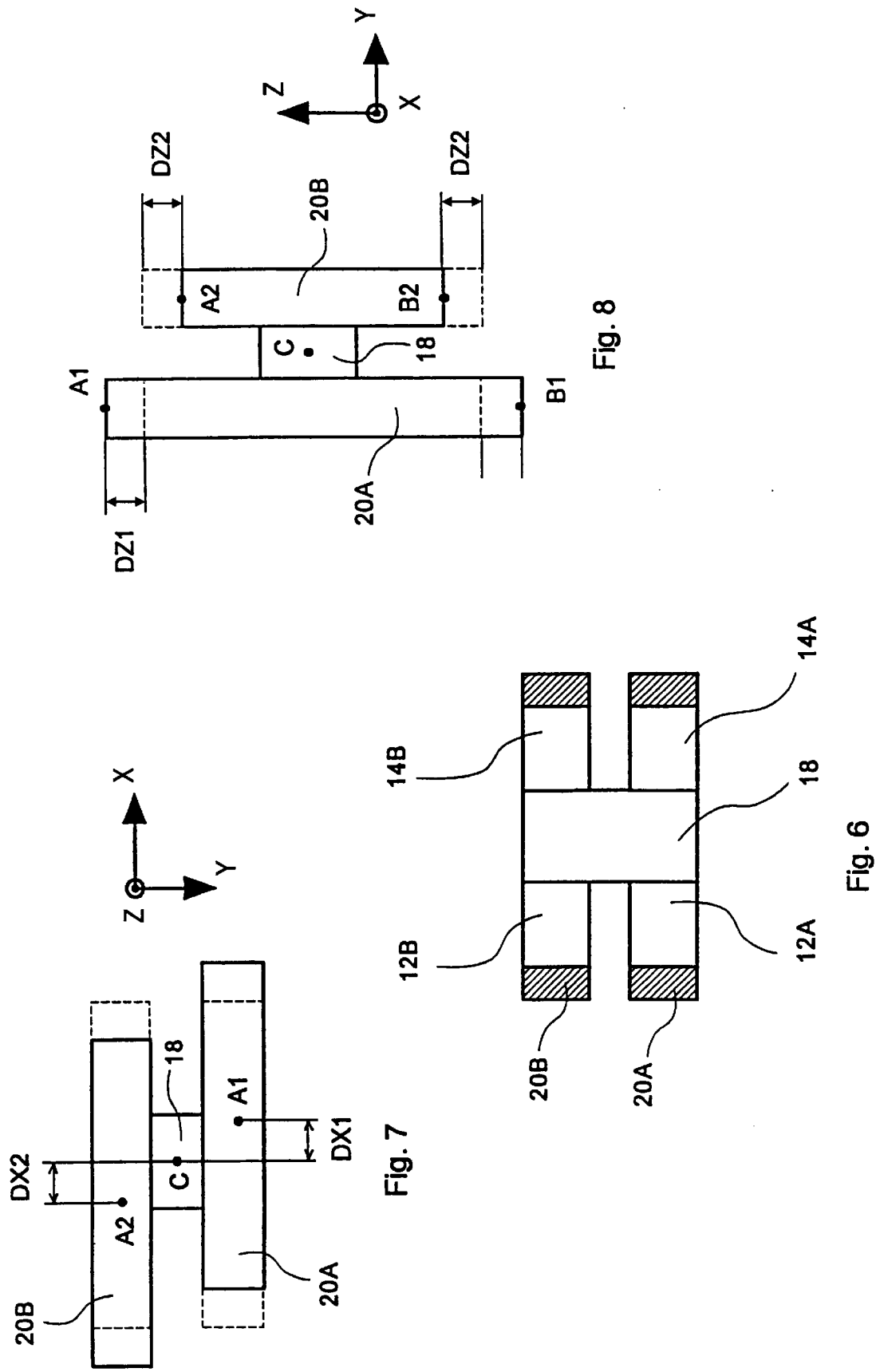

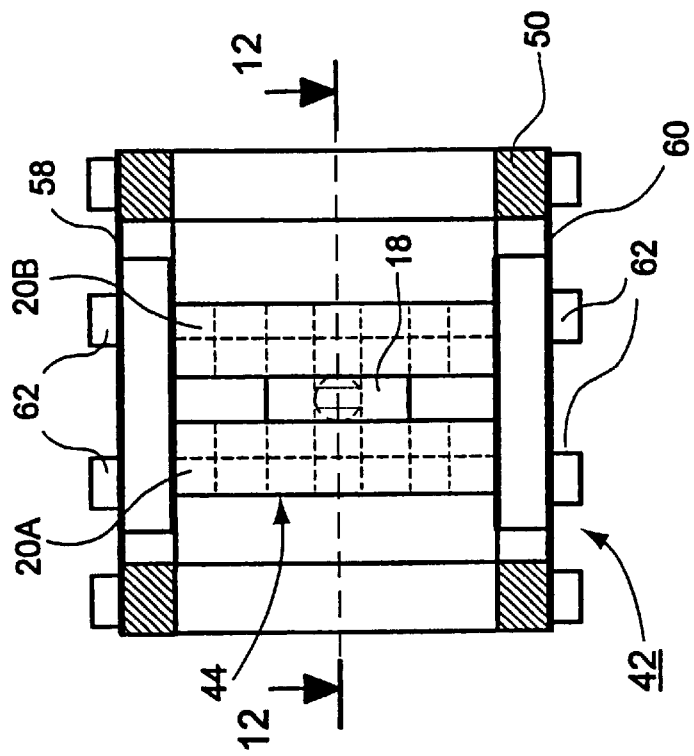
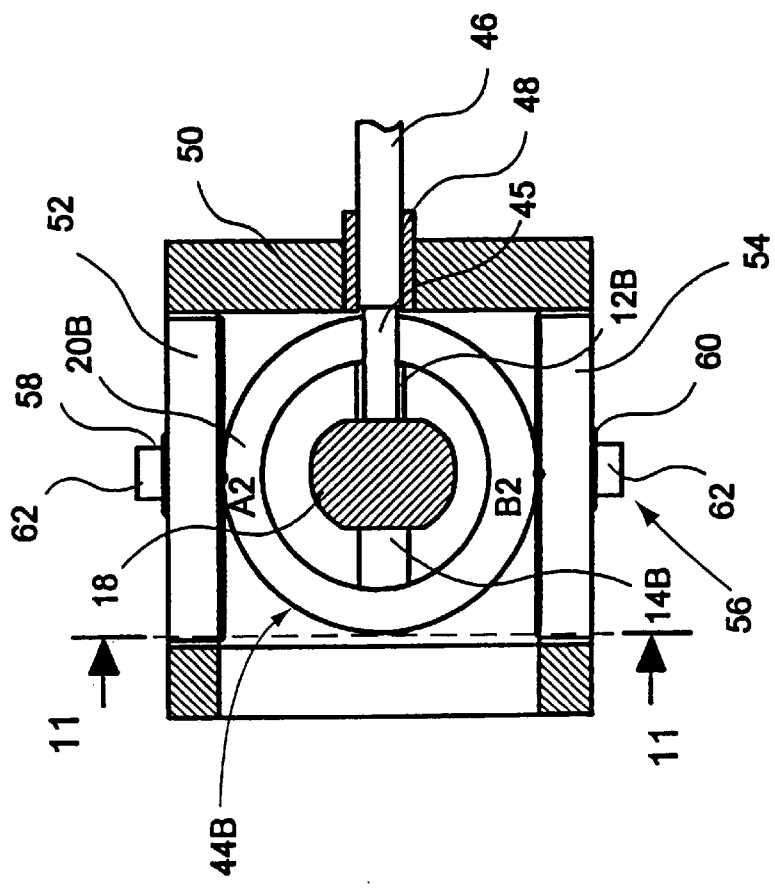

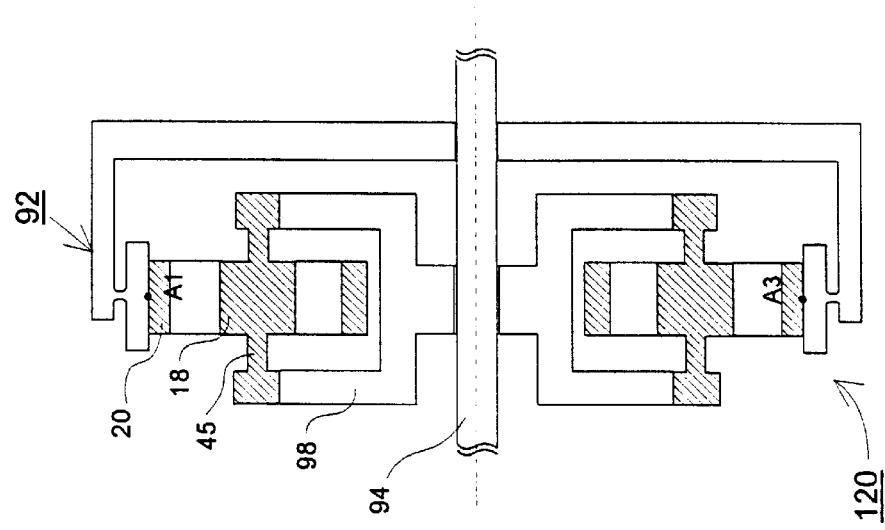
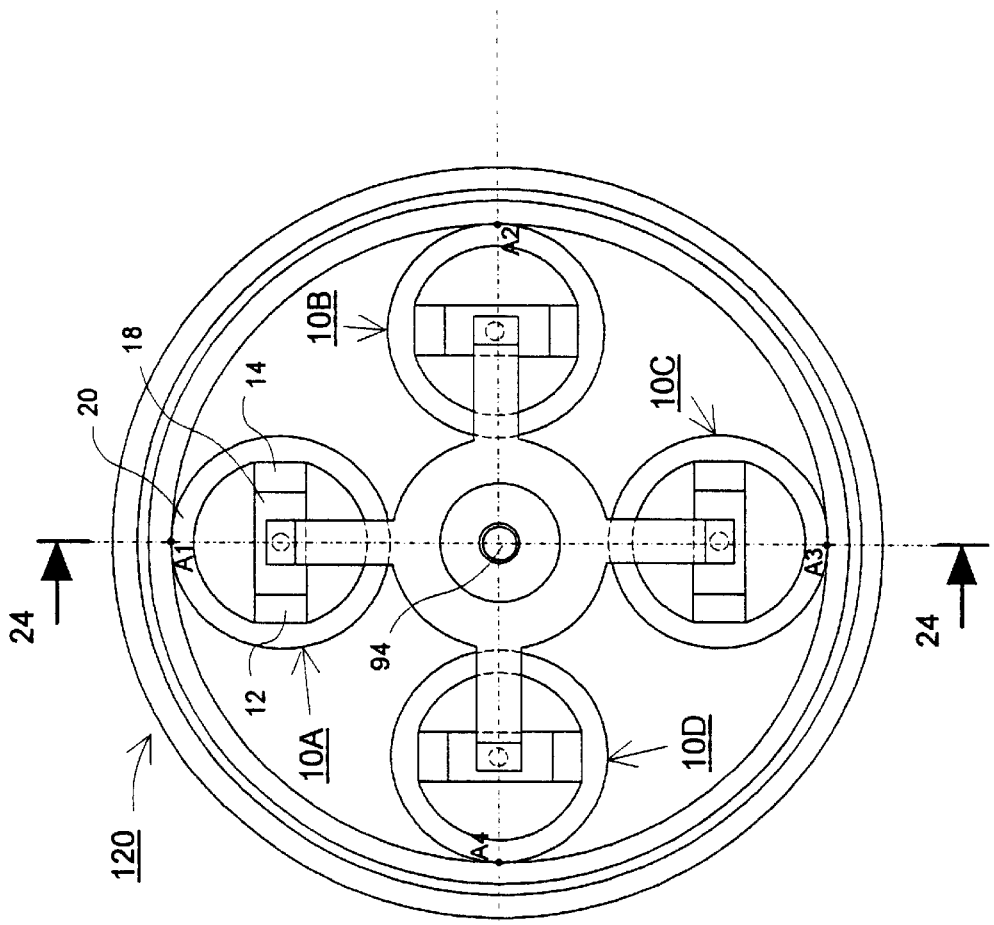
Fig. 24
Fig. 23

PIEZOACTIVE MOTOR BASED ON INDEPENDENT STATOR MODULES

BACKGROUND OF THE INVENTION

The invention relates to a piezoactive motor equipped with one or more stator modules designed to vibrate to cause relative movement of a driven part over a large travel according to a dynamic operating mode, and possibly step by step operation by means of drive means by friction, said stator modules, by deforming, in addition enabling fine positioning of the driven part according to a direct actuator operating mode, each stator module comprising at least:

one pair of colinearly arranged piezoactive actuators electrically excited so as to deform and produce small longitudinal movements, a mechanical coupling element to which the movements of the two actuators are applied, said element being formed by a ring shaped as a shell and made of a deformable flexible material, surrounding each pair of actuators by fixing at two opposite points.

STATE OF THE ART

The document EP-A-313,072 A1 describes a piezoactive motor using a dynamic operation, whose stator is formed by a head animated by one or two piezoactive actuators whose direction of actuation is inclined at an oblique angle with respect to the direction of movement of the driven part. It requires a particular driving configuration suitable for driving pliable and flexible objects such as sheets of paper and based on a roller whose friction coefficient with respect to the driven part is lower than that of the head with respect to the driven part.

A major drawback of this stator is to cause flexion of the piezoactive actuators at the same time as their extension. Such a flexion is detrimental on account of the stress limits of the active materials and reduces the power performances of the motor. Another drawback is to require a particular driving configuration which considerably limits the field of application of the motor. Finally, the absence of any decoupling between the stator and frame results in vibrations on the frame which disturb its operation.

The document EP-A-313,072 A1 also describes a process which consists in performing fine positioning by means of operation as a direct actuator after rough positioning has been performed by means of dynamic high frequency operation. Direct actuator operation involves a movement which must be able to be in two directions, which leads to constraints on the electronics which are penalising in terms of cost. The piezoelectric actuator(s) must be able to be deformed in elongation and in contraction. However in practice, this contraction is much smaller than the elongation because of the coercive field limit, which limits the micropositioning travel. Furthermore, it is not possible in this known process to make use of step by step operation, useful for a rough positioning approach, in order to make a subsequent saving in consumption in direct actuator operation.

The document U.S. Pat. No. 5,424,597 describes a piezoactive motor using a step by step operation, whose stator is based on two parallel piezoactive arms, each being formed by a translator and a monitoring element and using links with flexible pivots. This motor operates by making a first arm establish a connection with the driven part by gripping, while the second arm moves and establishes a connection point a little further on before the first arm moves in turn, and so on. This step by step operation is possible in quasi-static manner, that is to say according to cycles whose frequency is low, from 50 to 100 Hz, and results in a maximum speed equal to 1 mm/s.

A major drawback of this motor is not to be able to use a dynamic operating mode because of the necessary overlap times and of the vibrations which would be transmitted to the frame, which limits its speed and efficiency.

The document FR-A-2,564,912 describes a piezoactive motor composed of two colinear piezoactive actuators and a mechanical coupler in the form of an elliptical annular shell. The shell receives the vibrations produced by the actuators via heads, which generates at its peak movements with an elliptical trajectory. The figure presenting the principle of the stator shows that the rear of the actuators is fixed to a stationary frame. According to this principle, the document describes in detail numerous structures of motors where the actuators are placed outside the shell. It also presents some stator configurations where the actuators are placed inside the shell. In this case, a median support or frame supports the actuators on each side. This median support forms an integral part of the frame, without being mechanically decoupled. It is moreover presented at the connection level with the actuators in the form of a thin, light part, the mass of which is small in comparison with that of the shell.

Because of this structure, motor configurations with internal actuators are incompatible with the principle proposed in the document and do not enable suitable dynamic operation. The longitudinal deformations of the internal actuators essentially cause movement of the median support due to its low inertia, instead of that of the shell. The movement of the median support is propagated throughout the frame. The behaviour of a module is not independent from the frame and from the other modules.

OBJECT OF THE INVENTION

The object of the invention is to achieve a compact piezoactive motor with a good efficiency, where the vibrations are produced both efficiently and in a well located manner in independent stator modules, and offering in addition fine positioning possibilities.

The piezoactive motor according to the invention is characterized in that:

each stator module is independent from the others, is free to vibrate, and is only fixed to other parts by flexible links performing decoupling in vibration, each stator module comprises in addition a central countermass playing the role of inertia, inserted without clearance inside the shells between the actuators, the mass ratio between the countermass and shell is chosen such that in vibration, the longitudinal deformations of the internal actuators generate a movement of the shell, of non-negligible amplitude with respect to that of the countermass, and preferably that the translation mode of the shell and the flexion mode of the shell are tuned in frequency in order to obtain a good efficiency.

Operation of the stator modules of the motor according to the invention is based on the following two independent deformations:

a first type of deformation, called translational deformation, is obtained when said piezoactive actuators are deformed longitudinally in opposition producing a tangential movement of the peaks of the shell relatively to the counter-mass.

a second type of deformation, called flexional deformation, is obtained when said piezoactive actuators are deformed longitudinally in identical manner producing a flexion of the shell, the countermass remaining immobile in the centre. Operation in this manner results in a normal movement of the peaks of the shell.

Supply of the actuators with DC voltage producing one or the other of these deformations enables a movement of the peaks of the shell to be obtained and maintained.

Supply of the actuators with variable periodic voltage at the same frequency produces translational deformation when the actuators are deformed in mechanical phase opposition, and flexional deformation when the actuators are deformed in mechanical phase. Vibrations of the peaks are then obtained either in quasi-static manner or in mechanical resonance, depending on the frequency. Translational mode and flexional mode are associated respectively to deformations in translation and in flexion, and take place at resonance frequencies respectively called translation and flexion frequencies.

A combination of these two types of deformation is obtained when said piezoactive actuators are deformed longitudinally in non-symmetrical and non anti-symmetrical manner. In periodic operating conditions, this case is obtained in the case where the actuators are neither in phase nor in phase opposition, for example when the actuators are in phase quadrature. The relative movement of the peak of the shell then presents a tangential component with a phase difference with respect to its normal component able to give rise to a closed trajectory, for example elliptical. This trajectory can be produced in quasi-static manner, using one of the modes, or more advantageously, by using the translational and flexional modes tuned. In this case, the resonance frequencies of these modes coincide approximately, which allows the structure with countermass according to the invention.

The importance of the countermass to obtain a non-negligible movement of the shell with respect to that of the countermass when vibrations occur using translational deformation is revealed by analytical expressions established in the generic case of a module with a non-loaded shell, with two actuators and a countermass and giving the approximate values of the ratio of the amplitudes of movements Um of the countermass and Uc of the shell, from Mc the mass of the shell and Mm the mass of the counter-mass:

$$Uc/Um = Mm/Mc$$

This expression shows that to obtain a non-negligible movement of the shell with respect to that of the counter-mass, it is essential for the mass ratio Mm/Mc not to be too low.

The importance of the countermass for tuning of the translation and flexion modes is revealed by analytical expressions established in this same case and giving the approximate values of the frequency Ft of translation mode and the frequency Ff of flexion mode, from Ka the stiffness of an actuator, Kc the stiffness of the shell in flexion by actuator, Mc the mass of the shell, Mc* the modal mass of the shell in flexion mode and Mm the mass of the counter-mass:

$$Ft = 1/(2.pi).(2.Ka.(1/Mc + 1/Mm))^{1/2}$$

and $$Ff = 1/(2.pi).(2.(Ka + Kc)/Mc^*)^{1/2}$$

Tuning of the modes Ft=Ff is obtained when the mass Mm fulfills the following condition:

$$Mc/Mm = (1 + Kc/Ka).Mc/Mc^* - 1$$

As Mc>Mc* and Kc/Ka>0, this results in Mc/Mm>0, which guarantees the existence of a solution for Mm. In practice, Kc and Ka are of the same order of magnitude, as are Mc and Mc*, which implies that Mm is also of the same order of magnitude as Mc.

These two conditions are compatible with one another and lead to a mass ratio Mm/Mc typically situated in a range from 1/3 to 3.

According to one feature of the invention, a removable additional mass is associated to the countermass to facilitate adjustment of the tuning of translation and flexion modes. Changing the additional masses modifies the translation mode frequency without modifying the flexion mode frequency. This tuning possibility is useful to correct the tuning discord introduced by contact of the peaks of the shells with the driven part, and by pre-loading.

In the motor according to the invention, the countermass is decoupled from any frame to be able to vibrate freely. Thus according to the cases, it is either totally free or attached to the frame or to the actuating shaft by flexible links, in particular in the form of blades.

The shell of the coupling element can present any shape, for example a cylindrical shape with a circular, elliptic or symmetrical basket handle cross section, or a perforated sphere or perforated ellipsoid shape. In the case of non-circular shells, the large axis over small axis ratio is not limited to a particular value, due to the counter-mass.

Piezoactive actuators are characterized by their ability to deform longitudinally, in elongation or in contraction, due to the action of an electrical control. They are achieved using piezoelectric, electrostrictive or magnetostrictive elements. The mechanical phase difference of the deformations of the actuators of a module is obtained by applying an electrical phase difference between their supply voltages.

The use of one or more stator modules, implying that at least one of the peaks of the shell is pressed against a guide, rotor or driven part presenting at least one degree of freedom with respect to these modules, enables motors to be achieved which are linear, rotary or with several degrees of freedom, using two or three types of different operation.

The static pressure between the stator modules and the guide, rotor or driven part by means of a flexible element such as a flexion spring or blade, called preloading, is applied during the assembly. It enables the modules to be held with respect to the guide, rotor or driven part under static conditions. In operation, preloading enables clearance, due for example to wear, to be taken up.

To obtain good driving and a good contact with the guide, rotor or driven part, these parts or the peaks of the shells can be coated with a friction layer for example a polymer layer.

In dynamic operation, the motors according to the invention use the closed trajectory produced at the peak of the stator modules to induce by friction a relative movement of the guide, rotor or driven part, taking advantage of its inertia. The travel obtained can thus be much greater than the amplitude of vibration of the modules, and is preserved with the actuators powered off. The use of tuned translation and flexion modes to generate the closed trajectory takes advantage of the mechanical overvoltage effect of the two modes. High tangential and normal vibration amplitudes are thus produced at the peak of the shells and give the motor a high speed, a good electromechanical efficiency and the advantage of a low voltage power supply.

In step by step operation, which is possible with motors based on stator modules with several coaxial shells, according to a possibility of the invention, the motors use the closed trajectories of the shells, with a phase difference between them within a module, to induce by friction a relative movement of the guide, rotor or driven part, taking advantage of their transverse stiffness. The travel obtained can thus be greater than the amplitude of vibration of the modules and is preserved with the actuators powered off. This operation is particularly advantageous in the case of low frequency use avoiding any inertia effect of the driven part, as it enables the latter to be stopped in position without sliding. It gives the motor a slow speed and a very good micronic positioning controllability. Its use leads to implementation of a specific movement control.

In direct actuator positioning, the motors according to the invention use quasi-static translational or flexional deformation of the modules to obtain a fine positioning, the peaks of the shell remaining in contact with the guide, rotor or driven part. The movement obtained is smaller than the amplitude of vibration of the modules and is only preserved with the actuators powered on. In the particularly interesting case where the modules are attached by a point situated on the front of the shell and in the axis of the actuators, flexional deformation is used, which only requires deformations of the actuators in extension. These deformations make good use of the maximum deformations of the piezoelectric materials without reaching their coercive field limit. They can moreover be generated with supply voltages of the same sign, all positive for example, which simplifies the electronics. The movement produced is then limited to a single direction which results in implementation of a specific movement control.

This operation gives the motor a submicronic positioning ability.

These different operating modes are complementary and can be used together to achieve positioning which is both quick and accurate.

Dynamic operation is used to perform large travel movements up to a position near to that required.

Direct actuator operation is used if a fine positioning is necessary.

Step by step operation enables a more precise approach to the required positioning than dynamic operation, enabling the consumption in direct actuator operation to be reduced.

A preferred embodiment leads to a linear motor with a mobile stator module with two shells, using the three types of operation. According to this mode, the stator module comprises a counter-mass, linked to two parallel pairs of coaxial actuators, each pair of coaxial actuators acting on a shell. This stator module is placed inside a frame with two fixed guide plates, coming into engagement with the opposite peaks of the shells, said plates extending parallel and symmetrically with respect to the alignment line of the piezoactive actuators. A pressing contact of the guide plates with the peak of the shells is ensured by a clearance take-up device with a flexible link, preloaded on assembly. In this structure, the actuating shaft can be fixed to the countermass via a flexible decoupling and passes between the two shells.

To obtain a piezoactive motor without bearings and with non-lubricated operation, the actuating shaft of the motor is coupled directly to the front of the shells by means of a flexible link with flexion. In this case, the stator module is positioned with respect to the frame by means of flexible guiding parts, fixed to the frame and to the front and rear of the shells.

It is particularly advantageous to obtain a motor with two degrees of freedom, with a stator module comprising:

a first pair of piezoactive actuators placed colinearly on each side of the countermass, a second pair of piezoactive actuators arranged colinearly on each side of the countermass and orthogonally to the first pair, the shell comprising four branches in the form of semi-ellipses surrounding said actuators, so as to generate at its peak movements in two planes perpendicular to one another.

The stator module is located inside a cup and cooperates with a spring device to provide a motor of ball and socket joint type, with two degrees of freedom in rotation on a limited angular travel.

According to an alternative embodiment, the shell of the stator module of the motor cooperates with an angular sector of a wheel articulated on a spindle, a spring being secured between the inertia mass and a securing point.

DESCRIPTION OF THE FIGURES

Other advantages and features will become more clearly apparent from the following description of different embodiments given as non-restrictive examples only, and represented in the accompanying drawings in which:

FIG. 6 schematically represents a cross sectional view of a stator module with two shells according to the line 1—1 of FIG. 1;

FIG. 7 schematically represents a top view of the stator module with two shells of FIG. 6, in a translational deformation where the two shells are in mechanical phase opposition, in an unbroken line, compared to the structure at rest, in a broken line;

FIG. 8 schematically represents a top view of the stator module with two shells of FIG. 6, in a flexional deformation where the two shells are in mechanical phase opposition, in an unbroken line, compared to the structure at rest, in a broken line;

FIG. 10 represents a first embodiment of a linear piezoactive motor, represented in cross section along the line 10—10 of FIG. 12;

FIG. 11 is a cross sectional view along the line 11—11 of FIG. 10;

FIG. 23 schematically represents a rotary motor with four modules;

FIG. 24 represents a cross sectional view along the line 24—24 of FIG. 23;

DESCRIPTION OF A PREFERRED EMBODIMENT

Figure 1:
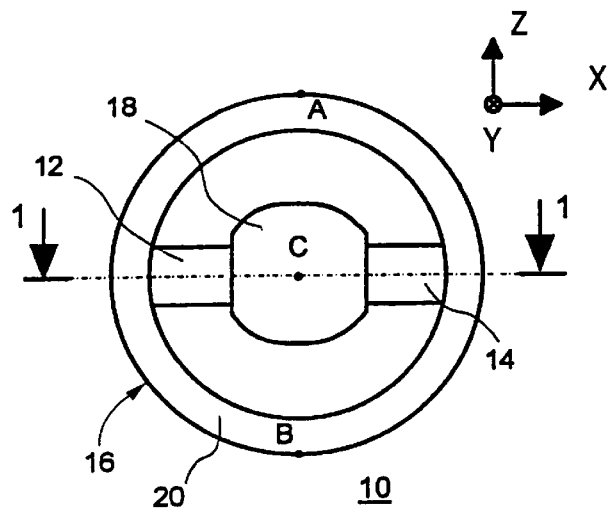
FIG. 1 represents a schematic view of a stator module according to the invention, in the rest state without excitation of the piezoelectric actuators.

With reference to FIG. 1, the vibrating stator of a piezoactive motor comprises two piezoactive actuators 12, 14 colinearly arranged inside a mechanical coupling element 16 with a mobile countermass 18 interposed in the central part. The piezoactive actuators can for example be made of sintered ceramic PZT materials. As an example, an actuator may be a mass or multilayer ceramic, a stack of ceramics, a unimorph formed by an inactive blade and a piezoactive layer, or a bimorph formed by an inactive blade and two piezoactive layers. In the latter two cases, the shell, countermass and inactive blade can be achieved in a single flat part having the form of the complete module, onto which the piezoactive layers are added.

Instead of piezoactive actuators, it is also possible to use magnetostrictive or electro-strictive actuators. The actuators 12, 14 are fixed by any means at two diametrically opposite points inside the coupling element 16 and at two diametrically opposite points of the shell 12.

The mechanical coupling element 16 is formed by a closed ring shaped as a shell 20 and made of a flexibly deformable material, for example of steel or aluminium alloy. In FIG. 1, the ring of the coupling element 16 is cylindrical, but it could also have an elliptic shape or be basket-shaped.

Under the effect of supply signals delivered by a power generator or source, the piezoactive actuators 12, 14 produce longitudinal movements or longitudinal vibrations in the direction of the diametrical axis of alignment of the actuators.

The movements produced by the piezoactive actuators 12, 14 when electrical excitation occurs are transmitted to the shell 20 of the coupling element 16, which is subjected to two independent deformations.

Figure 2:
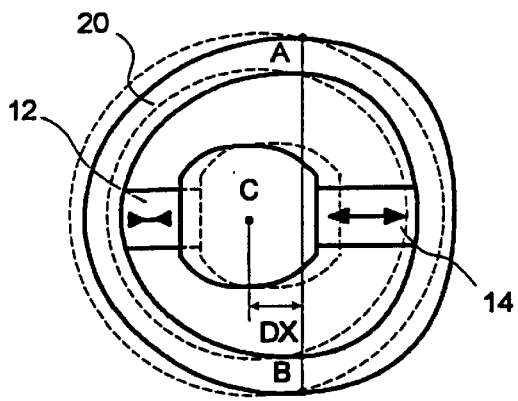
FIG. 2 schematically represents the structure of FIG. 1 in a translational deformation, in an unbroken line, compared to the structure at rest, in a broken line.

FIG. 2 schematically presents the translational deformation obtained when the piezoactive actuators 12, 14 are deformed longitudinally in mechanical phase opposition, that is to say one in contraction and the other in elongation, and produce a relative tangential movement DX of the peaks A and B of the shell 20 with respect to the centre C of the countermass 18. This deformation can be produced in quasi-static conditions or in translation mode.

Figure 3:
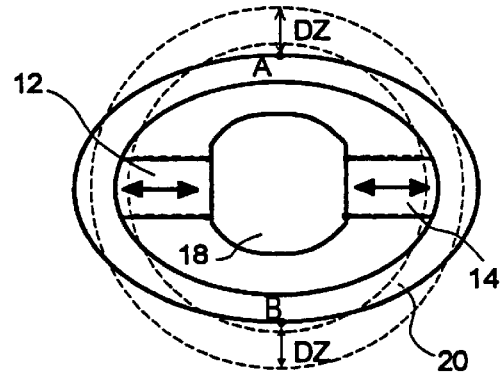
FIG. 3 schematically represents the structure of FIG. 1 in a flexional deformation, in an unbroken line, compared to the structure at rest, in a broken line.

FIG. 3 schematically presents the flexional deformation obtained when the piezoactive actuators 12, 14 are deformed longitudinally in mechanical phase, that is to say in the same way, and produce a flexion of the shell 20 resulting in a normal movement DZ of the peaks A and B of the shell, the countermass 18 remaining immobile in the centre. This deformation can be produced in quasi-static conditions or in flexion mode.

A combination of these two types of deformation is achieved when the piezoactive actuators are deformed longitudinally at the same frequency in the other cases of mechanical phase, such as phase quadrature. The movements of the peaks A and B of the shell then describe a closed trajectory for example elliptical, used to drive a driven part by friction. This trajectory can be produced in quasi-static operating conditions, or in more advantageous manner, by using an approximate tuning of the translation and flexion modes to take advantage of the overvoltage effect due to mechanical resonance.

Figure 5:
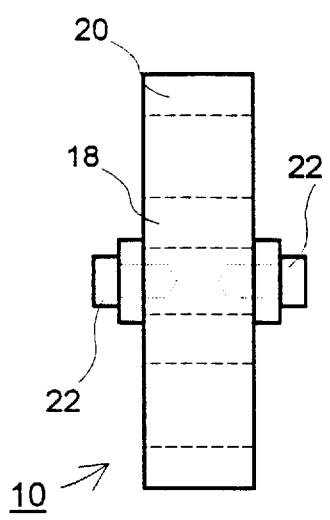
FIG. 5 is a side view of FIG. 4.
Figure 4:
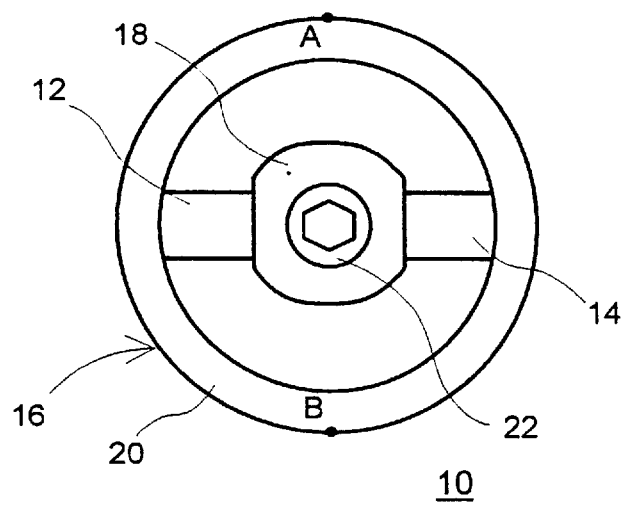
FIG. 4 is an identical view to FIG. 1 with fitting of a removable additional mass fixed on the counter-mass.

With reference to FIGS. 4 and 5, this tuning is obtained by means of the judiciously chosen value of the mass and countermass 18, and accessorily of removable and interchangeable additional masses 22, enabling fine tuning to be performed without requiring complete disassembly of the module. This possibility is useful to correct the tuning discords introduced by the contact of the peaks A or B with the driven part and by the preloading.

FIGS. 6, 7 and 8 relate to a module with two coaxial shells 20A and 20B joined to the common countermass 18 by the piezoactive actuators 12A, 14A, 12B and 14B. If the actuators are supplied in such a way that the deformations of the actuator 12A are identical to those of the actuator 12B, and likewise for 14A with respect to 14B, the translational and flexional deformations can be produced in exactly the same manner as described in FIGS. 2 and 3. The relative movements of the peaks A1 and A2 of the shells 20A, 20B are then in mechanical phase. Mode tuning is obtained by means of the judiciously chosen value of the mass and countermass 18, with accessorily additional masses, noting that, in the previous formulas Mc represents half of the mass of the countermass to take account of the number of shells and actuators.

The presence of two shells animated by two independent pairs of actuators does however offer additional possibilities notably in terms of mechanical phase displacement of the relative movements of the peaks A1 and A2 of the shells, as illustrated by FIGS. 7 and 8.

FIGS. 7 and 8 represent the stator module respectively in translational and flexional deformations, where the two shells 20A, 20B are in mechanical phase opposition. This phase opposition is produced by supplying the pairs of actuators with voltages of opposite signs. Under these conditions, if the piezoactive actuators are deformed longitudinally at the same frequency and in such a way that the two actuators of a pair are in phase quadrature, the movements of the peaks A1 and A2 of the shells 20A, 20B describe closed trajectories, for example elliptical, being in phase opposition with respect to one another. These movements enable a driven part to be driven by friction in a step by step operation. This operation is particularly advantageous in the case of low frequency use avoiding any inertia effect of the driven part, as it enables the latter to be stopped in position without sliding.

Figure 9:
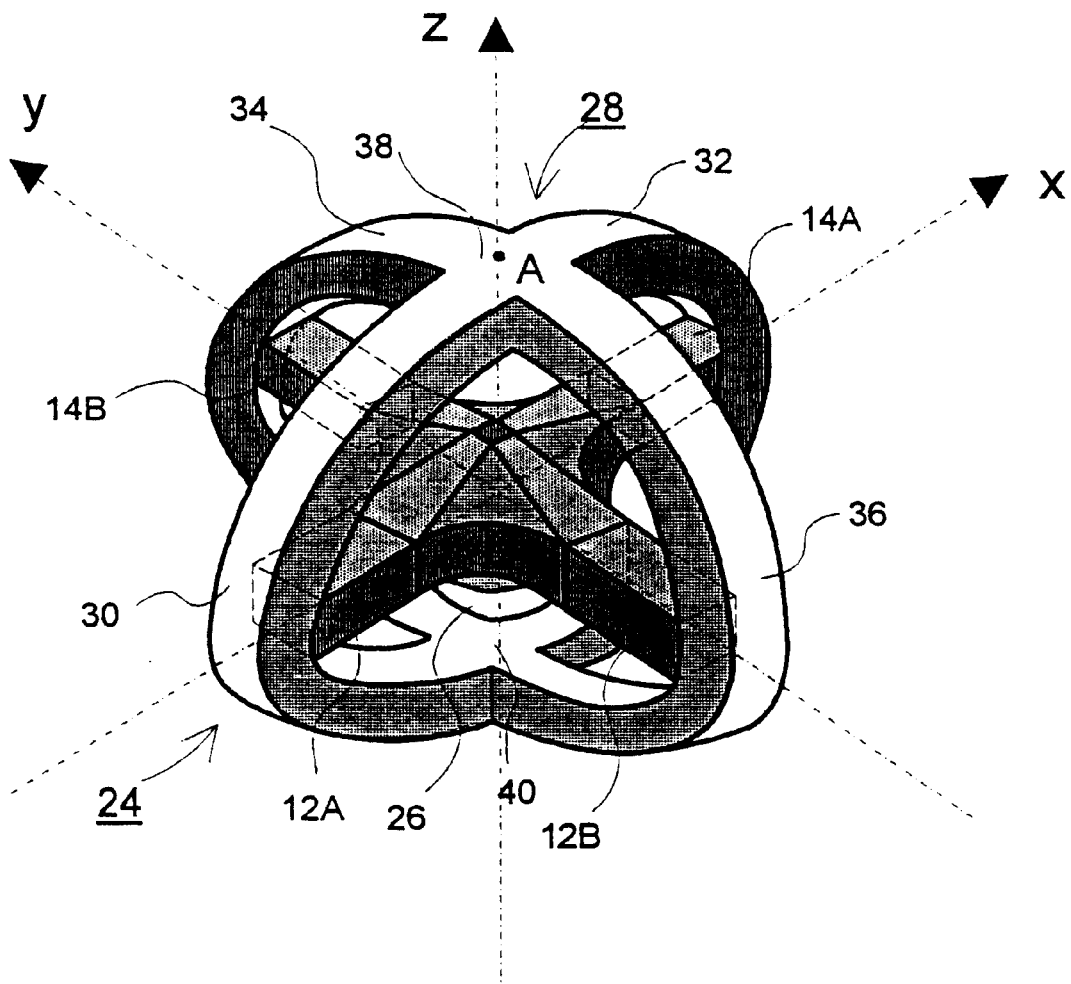
FIG. 9 shows a stator module of three-dimensional structure, suitable for a piezoactive motor with two degrees of freedom.

FIG. 9 illustrates a stator module 24 of three-dimensional structure for a piezoactive motor with two degrees of freedom. The stator module 24 is equipped in the central zone with a mobile countermass 26, to which there are associated in the form of a cross a first pair of piezoactive actuators 12A, 14A and a second pair of piezoactive actuators 12B, 14B, extending respectively according to two perpendicular axes x and y. A shell 28 forming the mechanical coupling element comprises four branches 30, 32, 34, 36 in the form of semi-ellipses enclosing the two pairs of actuators 12A and 14A; 12B and 14B, and joined to one another by two joining zones 38, 40 positioned on the z axis extending orthogonally to the x and y axes. The two joining zones 38, 40 form the peaks of the shell 28.

Production of deformations in the stator module 24 of FIG. 9 takes place in the following manner:

Translational deformation in the x z plane is obtained when the piezoactive actuators 12A and 14A of the first pair are deformed longitudinally at the same frequency in mechanical phase opposition and produce a tangential movement according to x of the peaks A and B of the shell 28 relatively to the countermass 26. In the same way, translational deformation in the y z plane is obtained by means of the second pair of actuators 12B and 14B and produces a tangential movement according to x of the peaks A and B of the shell 28 relatively to the countermass 26.

In the same way, a translational deformation in the y z plane is obtained by means of the second pair of actuators 12B and 14B and produces a tangential movement according to y of the peaks A and B relatively to the countermass 26. Flexional deformation is obtained when the piezoactive actuators of at least one pair are deformed longitudinally at the same frequency, in mechanical phase, and produce a flexion of the shell 28, the countermass 26 remaining immobile in the centre. This results in a normal movement of the peaks of the shell 28 according to z.

The combination of these two types of deformation can give rise to a closed trajectory of the peaks A and B, for example elliptic, situated in any plane containing the z axis. This trajectory can be produced in quasi-static conditions, or more advantageously, by using tuning of the translation and flexion modes obtained by means of the countermass.

The stator module 24 of FIG. 9 is designed for driving a part by friction according to the x and y axes, the assembly constituting a piezoactive motor with two degrees of freedom.

Figure 12:
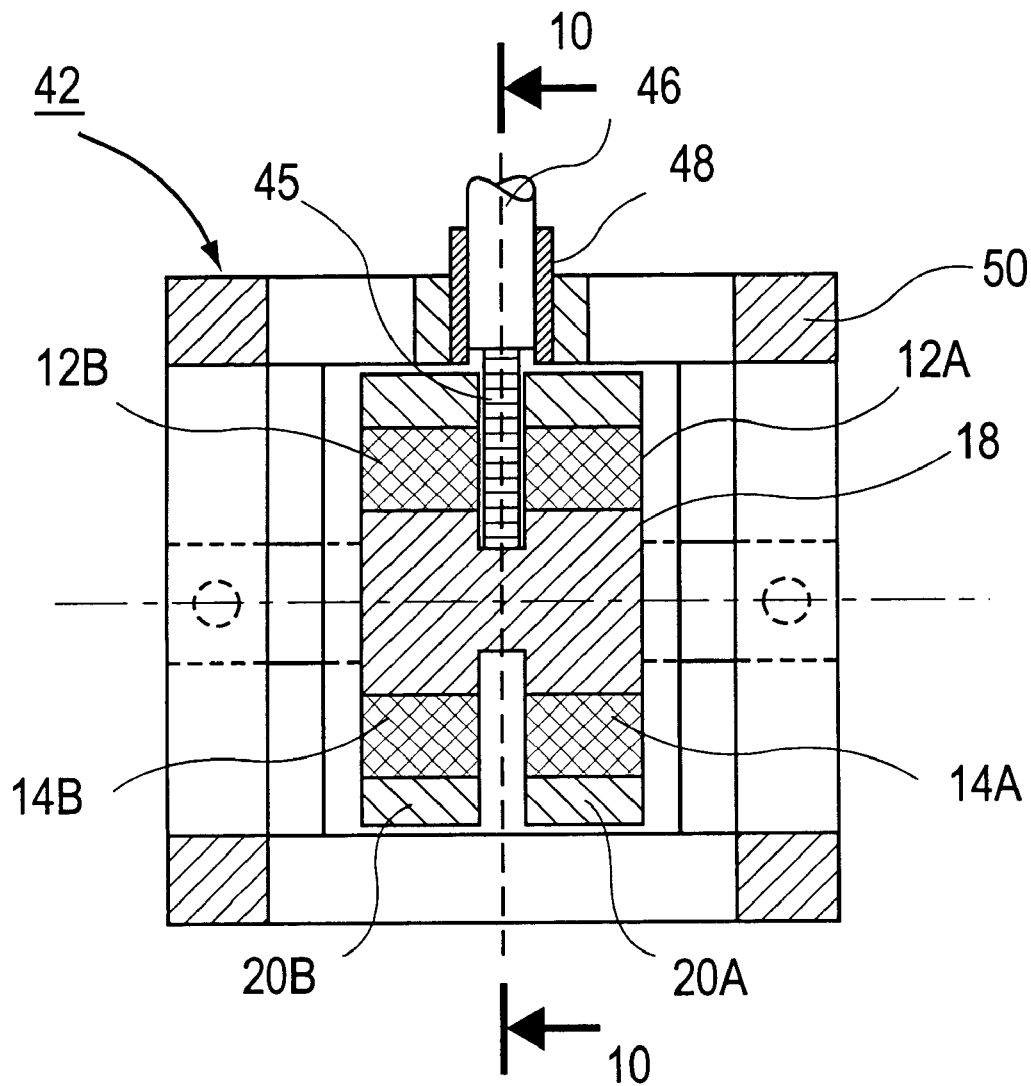
FIG. 12 is a cross sectional view along the line 12—12 of FIG. 11.

A first embodiment of a linear piezoactive motor 42 is represented in FIGS. 10 to 12 and comprises a stator module 44 formed by two symmetrical half-modules 44A, 44B arranged in parallel, this module being of the type described with reference to FIGS. 6, 7 and 8. The structures of the half-modules 44A, 44B are identical. The countermass 18 is common to the two half-modules 44A, 44B, and the actuating shaft 46 of the motor 42 is mechanically coupled to the countermass 18 by a decoupling blade 45 passing between the shells 20A, 20B. Guiding of the shaft 46 in translation is performed by means of a bearing 48 arranged in the fixed frame 50.

The stator module 44 is placed inside the frame 50 with two fixed guide plates 52, 54 coming into engagement with the peaks A1, A2, B1, B2 of the shells 20A, 20B of each half-module 44A, 44B. The two guide plates 52, 54 extend parallel and symmetrically with respect to the shaft 46 and to the line of action of the piezoactive actuators 12A, 14A, 12B, 14B, and cooperate with a clearance take-up device 56 with a flexible link performing preloading on the shells 20a, 20B via their peaks A1, A2, B1, and B2. This preloading maintains the stator module at rest in contact with the internal faces of the plates 52, 54, which are coated with a friction layer.

The clearance take-up device 56 comprises for example flexion blades 58, 60 bearing in opposition on the external faces of the plates 52, 54. The flexion blades 58, 60 are fixed by screws 62 and exert a compression force between the stator module 44 and the guide plates 52, 54 generating the blocked force in the absence of power supply of the motor 42. The flexion blades can naturally be replaced by any other type of spring performing the same function.

In this linear motor, the stator module is mobile with respect to the frame. It moves by friction with the two guide plates 52, 54 fixed to the frame, driving the shaft 46 in translation. For large travels, it uses dynamic or step by step operation. For fine positioning, it uses direct actuator operation.

In dynamic operation, the closed trajectories of the two shells 20A, 20B induce the relative movement of the guide plates 52, 54 by friction making use of their inertia. For questions of stability and simplicity of power supply, it is preferable in general to make the two shells 20A, 20B vibrate in phase with respect to one another. It is in addition advantageous to use tuning of the translation and flexion modes, making use of the fact that the countermass 18 can vibrate freely, which is permitted by the flexible decoupling link 45. Moreover arranging the frequency of the modes so that it is ultrasonic, for example 20 kHz or more, means that the motor is silent and has a high no-load speed, typically in excess of 1 cm/s.

In this operation, the piezoactive actuator supply voltage wave forms are alternating and periodic, of identical shape and frequency for all the actuators, but with a time lag between one another of a fraction of a period, for example a quarter of a period. These wave forms are in general sinusoidal but not compulsorily so, the time lag then corresponding to a phase shift, for example of an angle of 90°.

In step by step operation, the closed trajectories of the peaks of the two shells 20A, 20B have a phase difference between one another and induce the relative movement of the guide plates 52, 54 by friction by taking advantage of the transverse stiffness of the assembly formed by these plates and the spring blades 58, 60. This stiffness has the result that when the module undergoes flexional deformation where the two shells 20A, 20B are in mechanical phase opposition, described by FIG. 8, the peaks of one of the shells are in contact with the plates 52, 54, while the peaks of the other shell are unstuck. Step by step operation makes use of the switches of this deformation to translational deformation where the two shells 20A, 20B are in mechanical phase opposition, described by FIG. 9. Because of the symmetries, the movements DX1 and DX2 are identical and noted DX. As a motor, the peaks of the two shells are all contacts, therefore being separated by a distance 2DX. Switching from the first to the second deformation produces a quarter of the closed trajectory of the peaks of the two shells 20A, 20B. A complete closed trajectory produces an elementary step able to reach at best 4DX. In this operation, no inertia effect of the plates 52, 54 is used, which enables quasi-static operation, for example at a few tens or hundreds of Hertz, leading to a slow no-load speed, typically less than 1 mm/s.

In this operation, the piezoactive actuator supply voltage wave forms are periodic, of identical frequency for all the actuators. They can for example be rectangular, triangular or trapezoid. They have a time lag between one another of a fraction of a period, for example a quarter of a period. Taking the actuator 12A as reference, the time lag of the supply voltage wave forms of the actuators 14A, 12B and 14B are respectively a quarter, a half and three quarters of a period for example.

Figure 13:
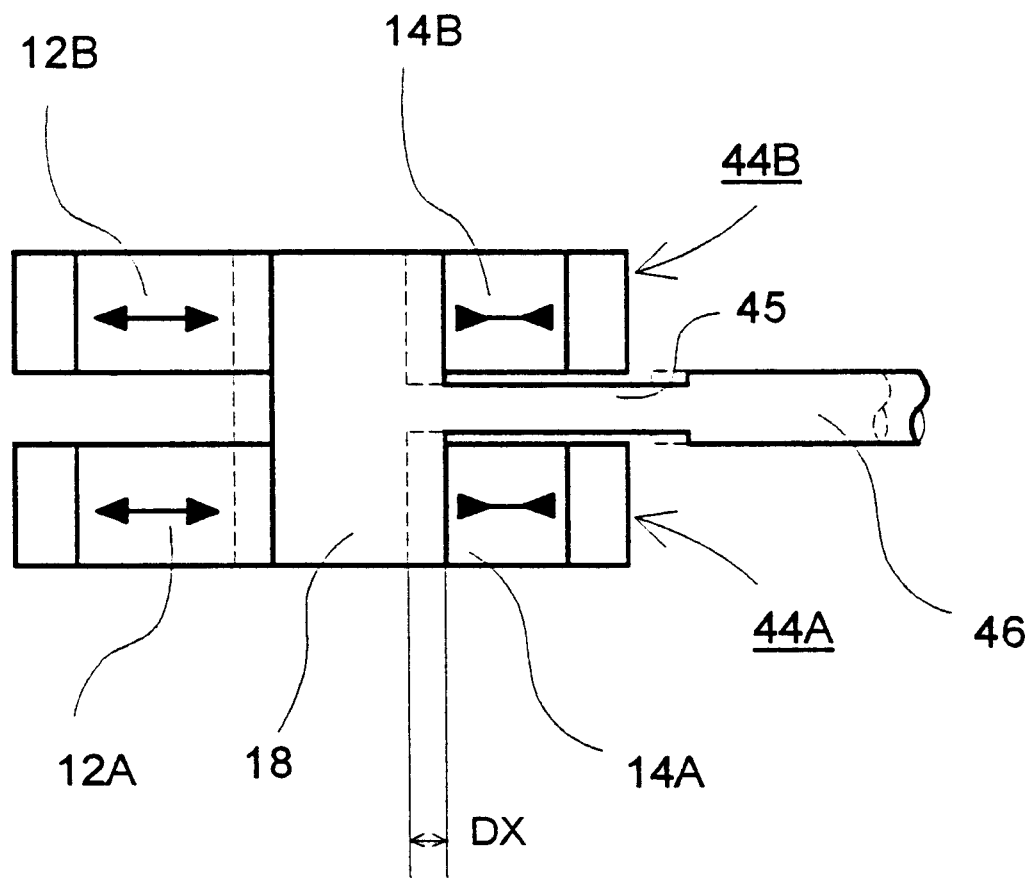
FIG. 13 illustrates a submicronic translation of the actuating shaft for a fine positioning, following a quasi-static translational deformation of the module.

In operation as a direct actuator, the peaks of the shells 20A, 20B remain in contact without sliding with the plates 52, 54, due to preloading. According to FIG. 13, the use of a translational deformation in quasi-static mode produces a movement DX of the countermass 18 resulting to that of the actuating shaft 46. In this operation, the supply voltages of the piezoactive actuators 12A, 12B, 14A and 14B define the required micro-movement DX directly and roughly proportionally.

Figure 14:
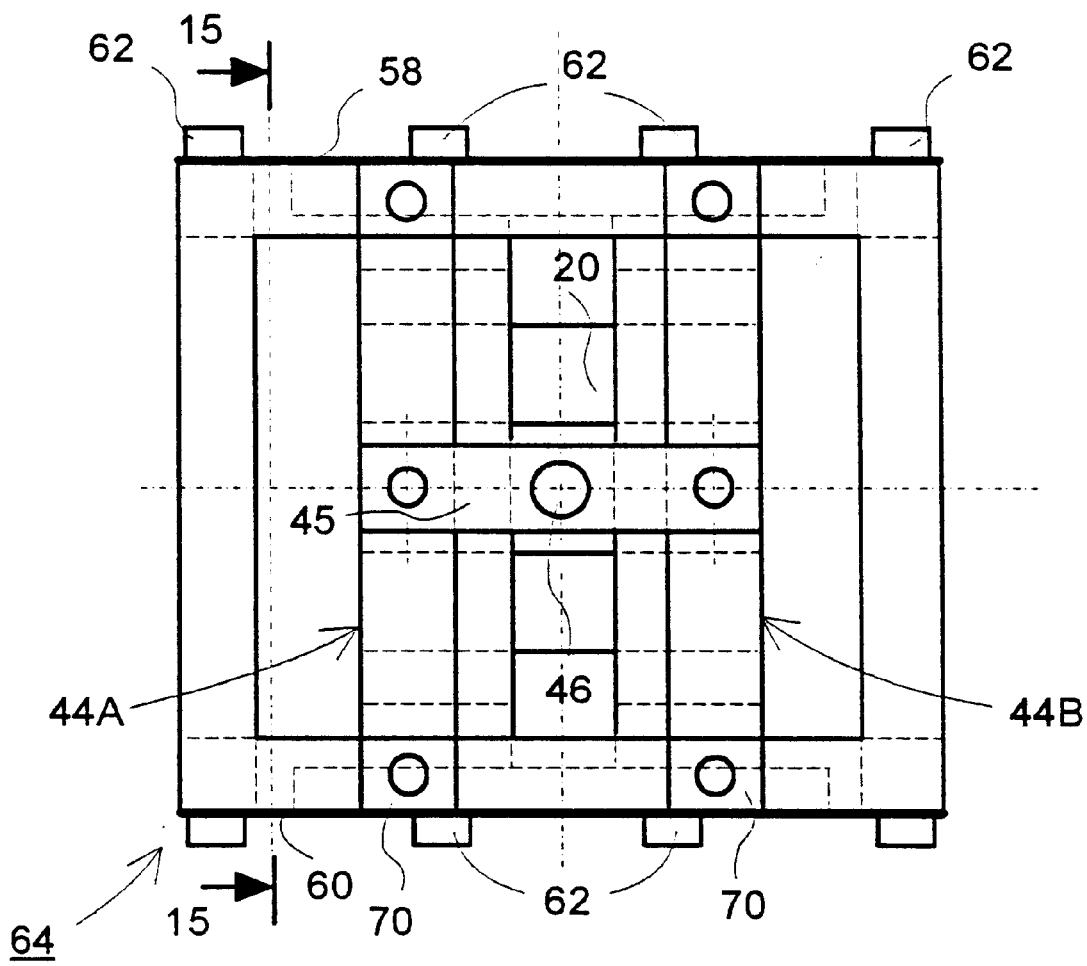
FIG. 14 illustrates a second embodiment of a linear piezoactive motor according to the invention.
Figure 15:
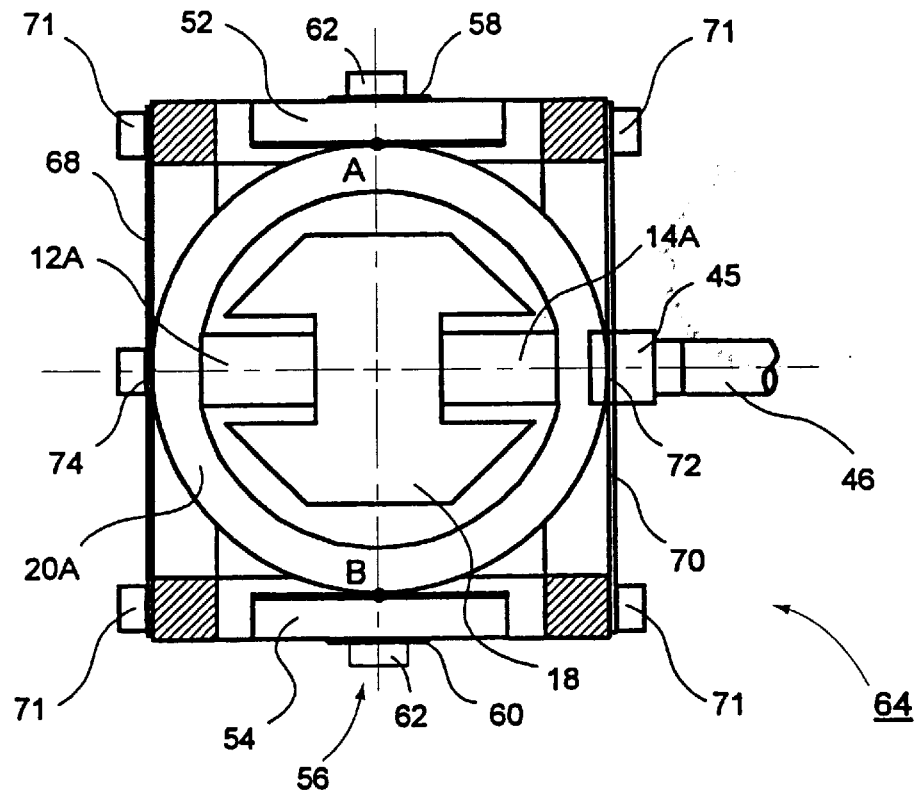
FIG. 15 is a cross sectional view along the line 15—15 of FIG. 14.
Figure 16:
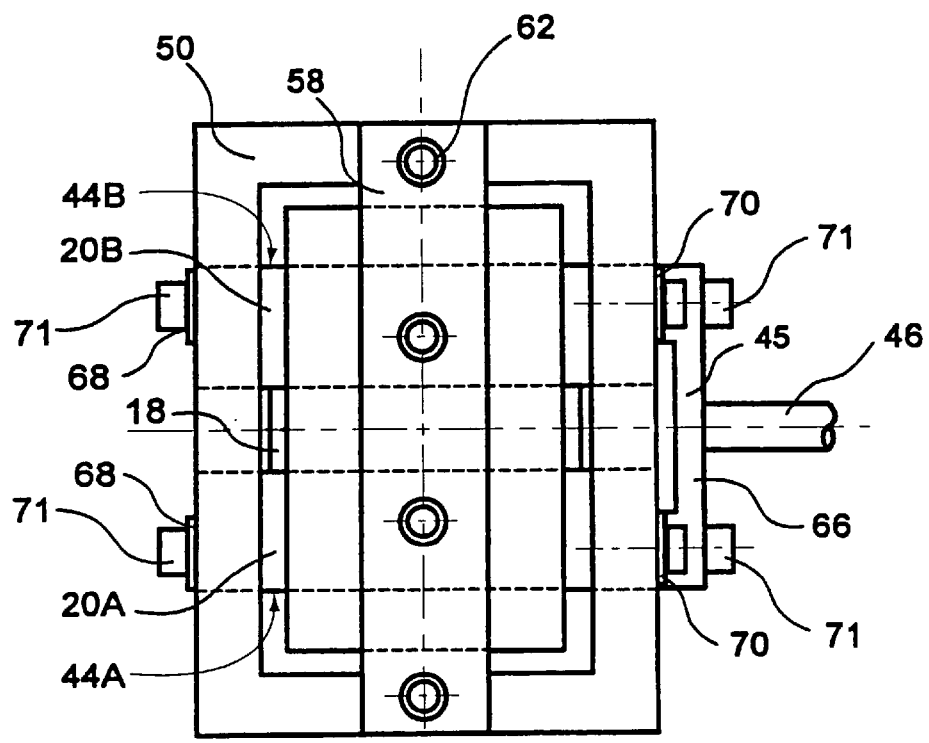
FIG. 16 is a top view of FIG. 15.

A second embodiment of a linear piezoactive motor 64 is illustrated in FIGS. 14 to 16. The stator module 44 is similar to the one described previously with reference to FIGS. 10 to 12, but the actuating shaft 46, instead of being fixed to the inertia mass 18, is coupled directly to the front of the shells 20 of the half-modules 44A, 44B by means of a flexion link 66. In addition to the guide plates 52, 54 and clearance take-up device 56 exerting a preloading on the shells 20 at the level of the peaks A and B, the stator half-modules 44A, 44B are positioned with respect to the frame 50 by means of guide parts formed by flexion blades 68, 70 fixed to the frame 50 by screws 71, and to the front 72 and rear 74 of the shells 20. The architecture of the motor 64 enables limited translational travels to be obtained, for example a few millimeters, with high transverse stiffnesses. No bearing is necessary for guiding the shaft 46, operation of the motor 64 taking place without lubrication.

In this linear motor, the stator module is mobile with respect to the frame. It moves by friction with the two guide plates 52, 54 fixed to the frame, driving the shaft 46 in translation. For large travels, it uses dynamic or step by step operation, as described with reference to FIGS. 10 to 12. For fine positioning, due to the fixing point of the shaft 46 to the front of the shell 20, it advantageously makes use of operation as a direct actuator in which the actuators use their extensional deformation and are supplied with equal and position voltages. In this operation, the peaks of the shells remain in contact without sliding with the plates, by means of the preloading. According to FIG. 17, the use of a flexional deformation in quasi-static operating mode produces a movement DX of the front of the shell 20 resulting in movement of the actuating shaft 46.

Figure 18:
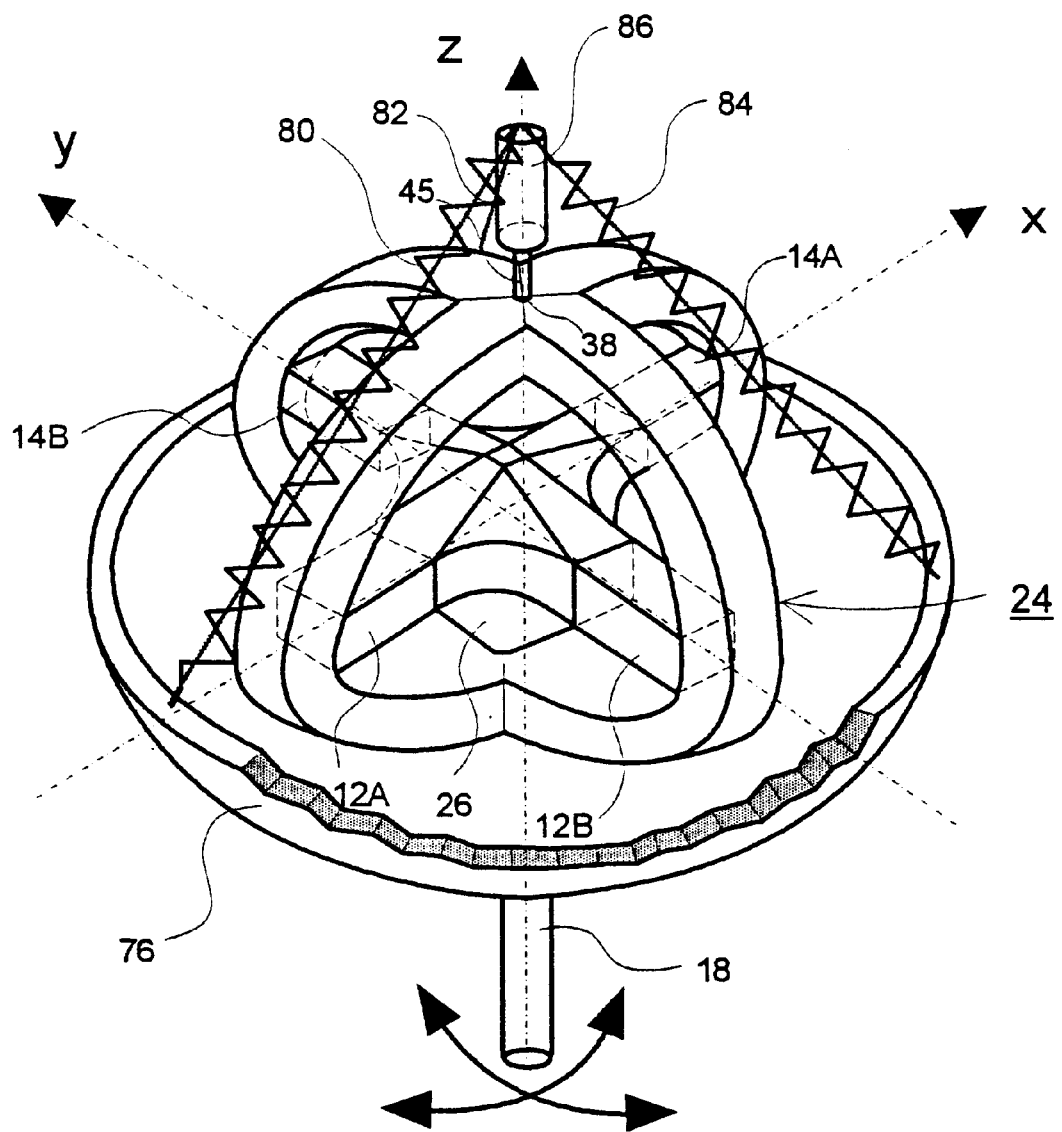
FIG. 18 shows a third embodiment of a piezoactive motor with two degrees of freedom in rotation.

A third embodiment according to FIG. 18 uses the stator module 24 of FIG. 9, arranged inside a housing cup 76 of splayed shape to constitute a motor 78 with two degrees of rotational freedom, with a limited angular movement range. A spring device 80, 82, 84 is secured between the periphery of the cup 76 and a rod 86 attached to the connecting zone 38 via a flexible link 45 so as to exert a prestressing force between the stator 24 and cup 76, while performing decoupling in vibration of the module with respect to the fixed frame (not represented). Excitation of the piezo-active actuators 12A, 14A with AC voltages in quadrature causes a rotational movement of the cup 76 around the y axis. Inversely, rotation of the cup 76 around the x axis is possible when excitation of the actuators 12B, 14B of the second pair takes place.

Figure 19:
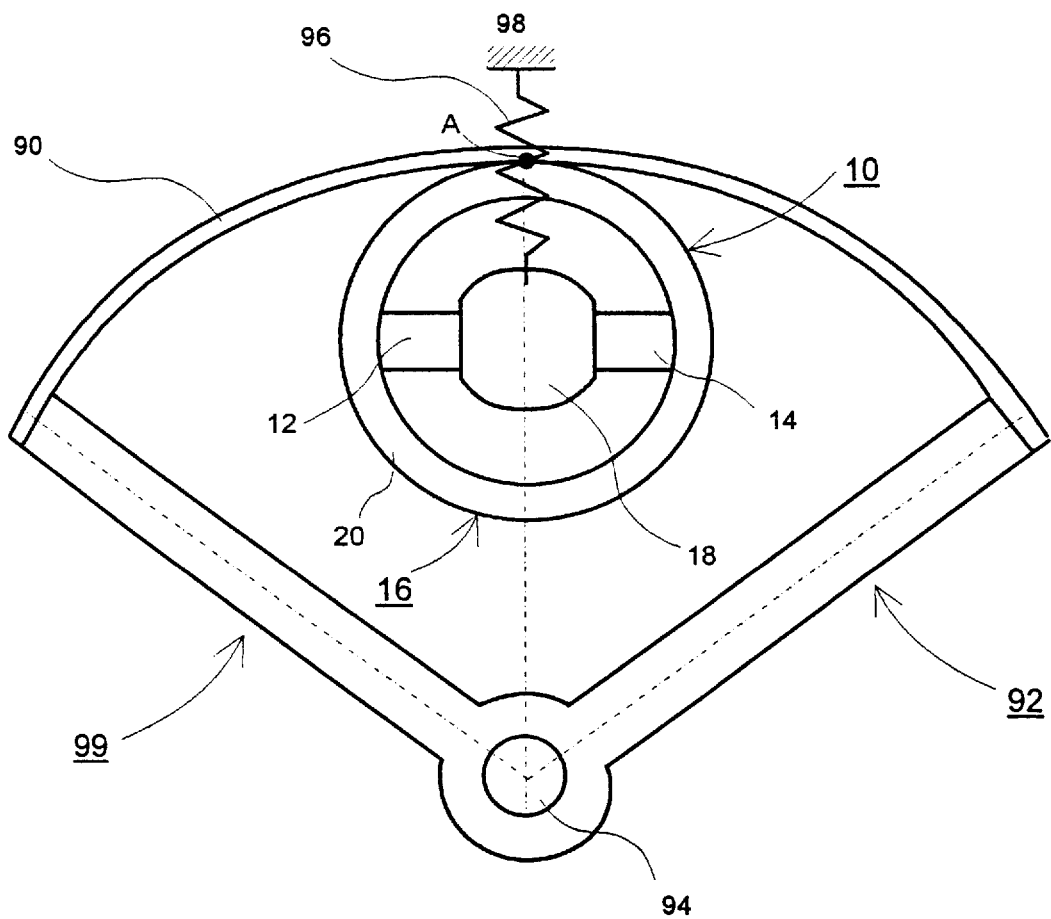
FIG. 19 shows a fourth embodiment of a rotary-driven piezoactive motor.

With reference to FIG. 19 relating to a fourth embodiment, the stator module 10 of FIGS. 1 to 3 cooperates by means of the peak A of the shell 20 with an angular sector 90 of a wheel 92 articulated on a spindle 94 to constitute a piezoactive motor 99. The shell 20 is kept pressing against the internal face of the angular sector 90 by means of a spring 96 secured between the inertia mass 18 and a securing point 98 of the frame located above the sector 90. Supply of power to the piezoactive actuators 12, 14 generating a closed trajectory of the point A causes rotation of the spindle 94.

Figure 21:
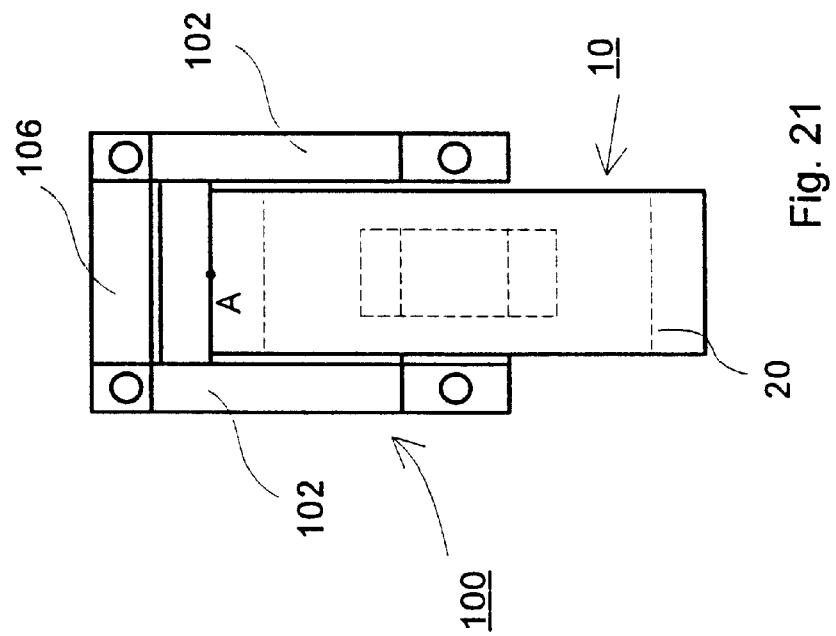
FIG. 21 is a side view of FIG. 20.
Figure 20:
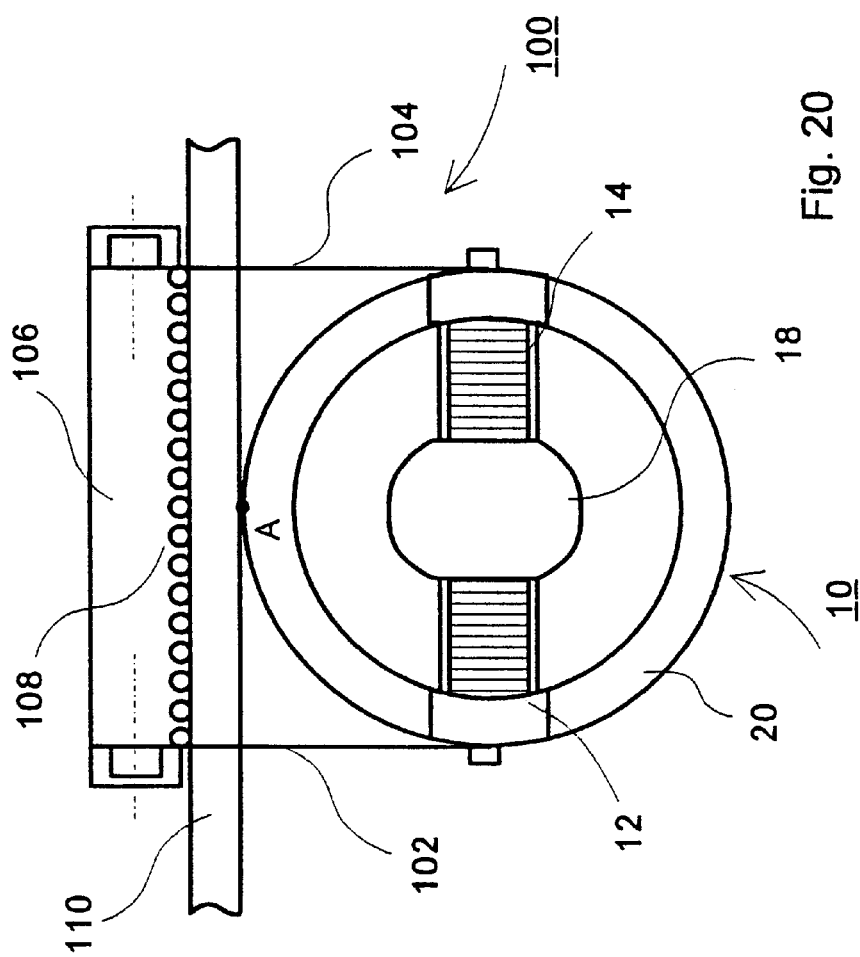
FIG. 20 illustrates an alternative embodiment for a linear piezoactive motor.

The stator module 10 of FIG. 1 can be used to design a linear motor 100 as represented in FIGS. 20 and 21. The shell 20 of the stator module 10 is joined by flexible blades 102, 104 performing preloading and decoupling of the module, to a support carriage 106, which is equipped with a sliding surface 108 borne by a guide 110 in the form of a rail. Supply of power to the piezoactive actuators 12, 14 generating a closed trajectory of the point A causes translational movement of the support carriage 106 along the guide 110 of unlimited length.

Figure 22:
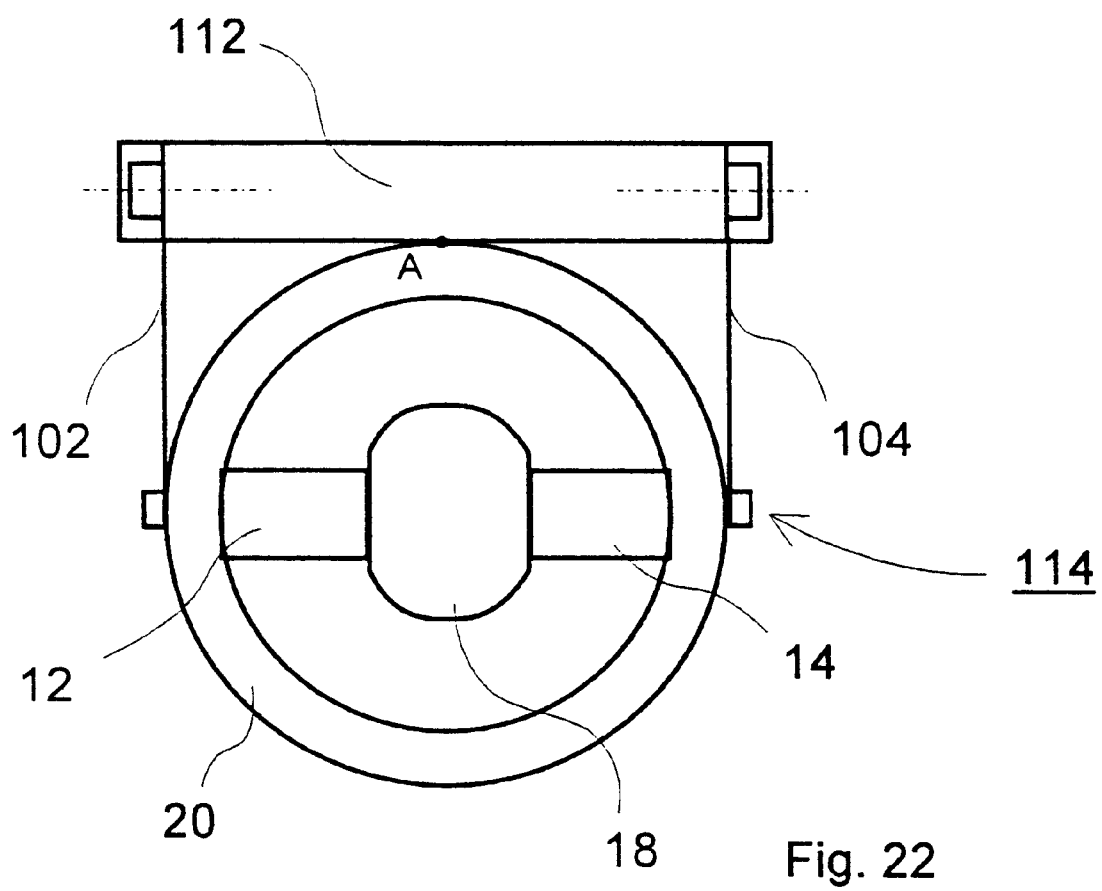
FIG. 22 is an identical view to FIG. 20 of another alternative embodiment.

In the alternative embodiment of FIG. 22, the shell 20 of the stator module 10 is linked by flexible blades 102, 104 to the opposite ends of a straight guide 112 having a predetermined length and extending in the direction of the line of action of the actuators 12, 14. The assembly forms a piezoactive motor 114 with limited travel movement.

FIGS. 23 and 24 present a rotary motor 120 whose stator is composed of four independent stator modules 10A, 10B, 10C and 10D. Each module has an identical structure to that of FIG. 1 and is fixed to the stator frame 98 by its countermass 18 via a flexible reducing part 45. This reducing part ensures decoupling in vibration of the module. Its flexibility is used to perform preloading on assembly and to take up the clearance of the modules. Each module is in contact by the points A1, A2, A3 and A4 with the rotor 92 securedly affixed to a spindle 94. Power supply of the piezoactive actuators 12 and 14 of each module generating a closed trajectory of the points A1, A2, A3 and A4 according to a dynamic operation causes driving of the spindle 94 in rotation. Operation as a direct actuator of the modules using opposite deformations as in the case of FIG. 13 causes a small tangential movement of the points A1, A2, A3 and A4 leading to an angular micro positioning of the rotor. This configuration of the motor could also use modules with two shells as described in FIGS. 6 to 8, offering in addition a rotary step by step operating mode.

Figure 25:
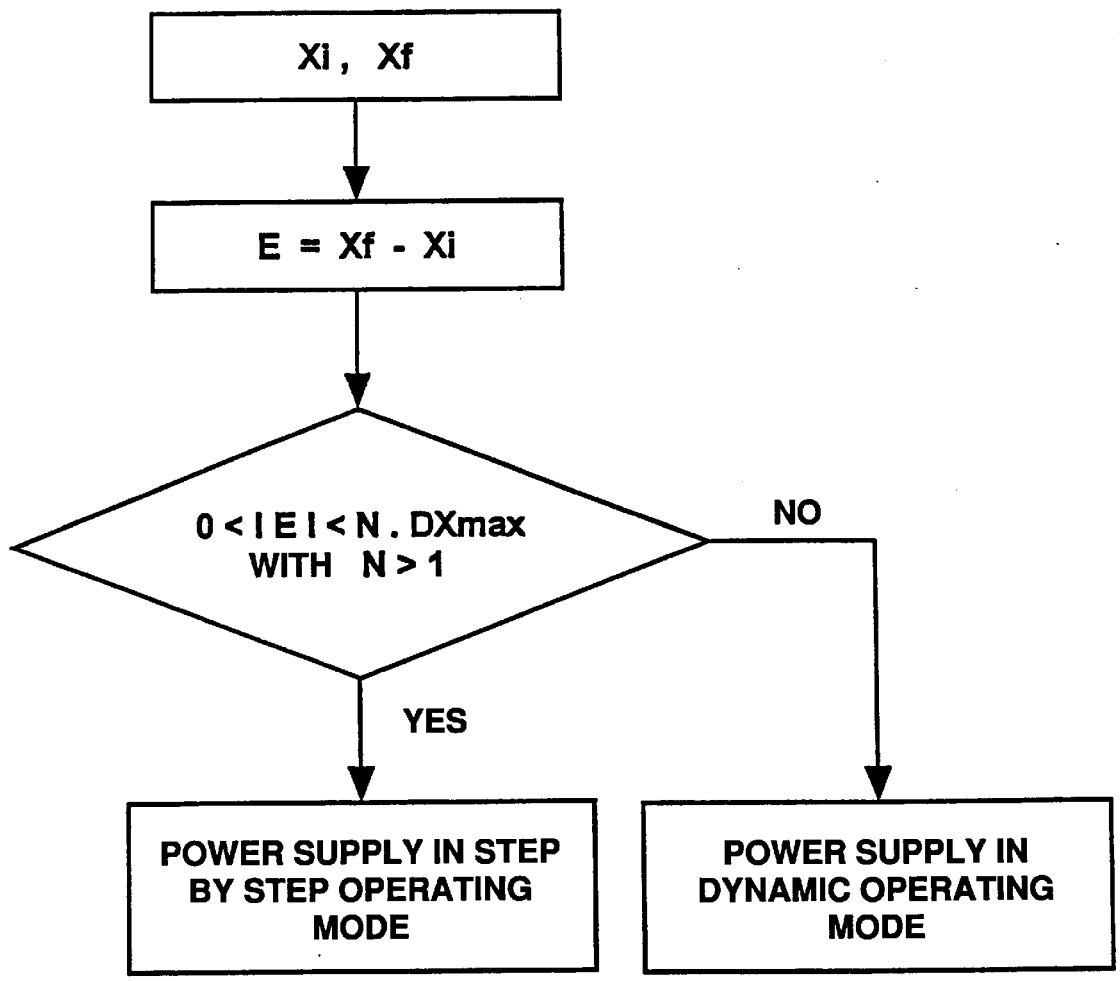
FIG. 25 shows a flowchart of a first movement control using step by step and dynamic operating modes.

FIG. 25 shows a first movement control applicable to piezoactive motors having the three types of operation. For the motor 42 illustrated in FIGS. 10 and 11, it is preferable to use the dynamic operating mode to perform the longest part of the travel before switching to step by step operating mode to take advantage of a braking stop which is both shorter and more precise. The operating mode as direct actuator may be used as the third mode. Combined use of the first and second modes is illustrated in the flowchart of FIG. 25, in which Xi represents the actual position of the motor, Xf is the final position required, and E represents the signed difference between the two positions Xf and Xi.

DXmax is the maximum movement in direct actuator mode, and N constitutes a parameter always greater than 1 and preferably about 10. Switching from the first mode to the second mode takes place as soon as the absolute value of the signed difference E is smaller than N times DXmax.

Figure 17:
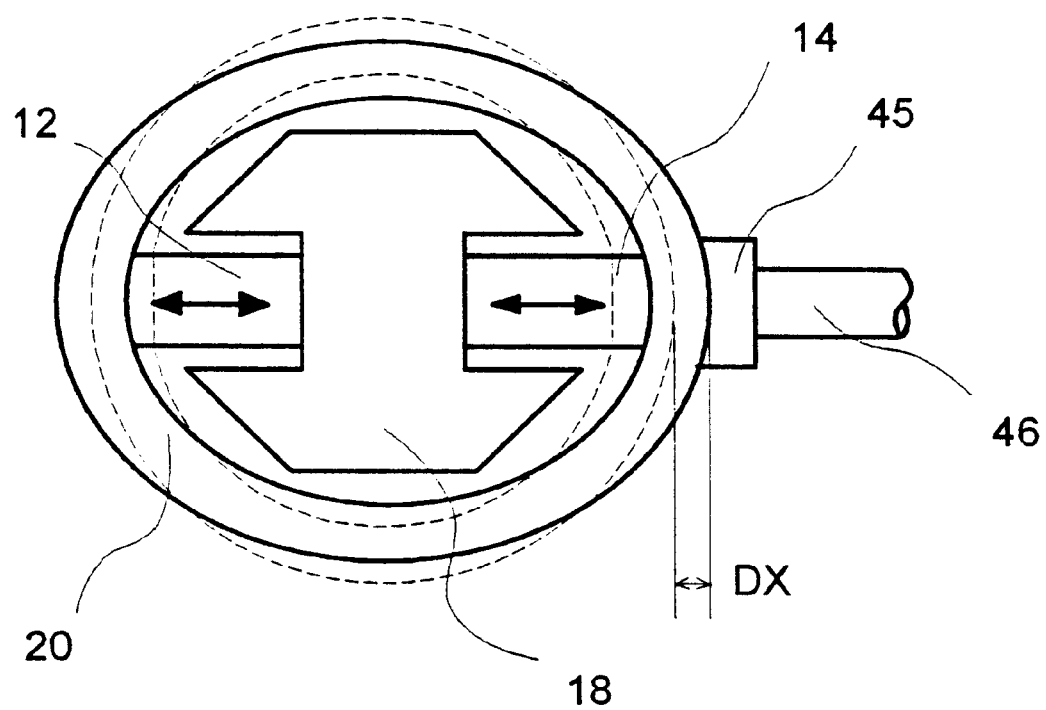
FIG. 17 shows a submicronic translation of the actuating shaft for a fine positioning, following a quasi-static flexional deformation of the module.
Figure 26:
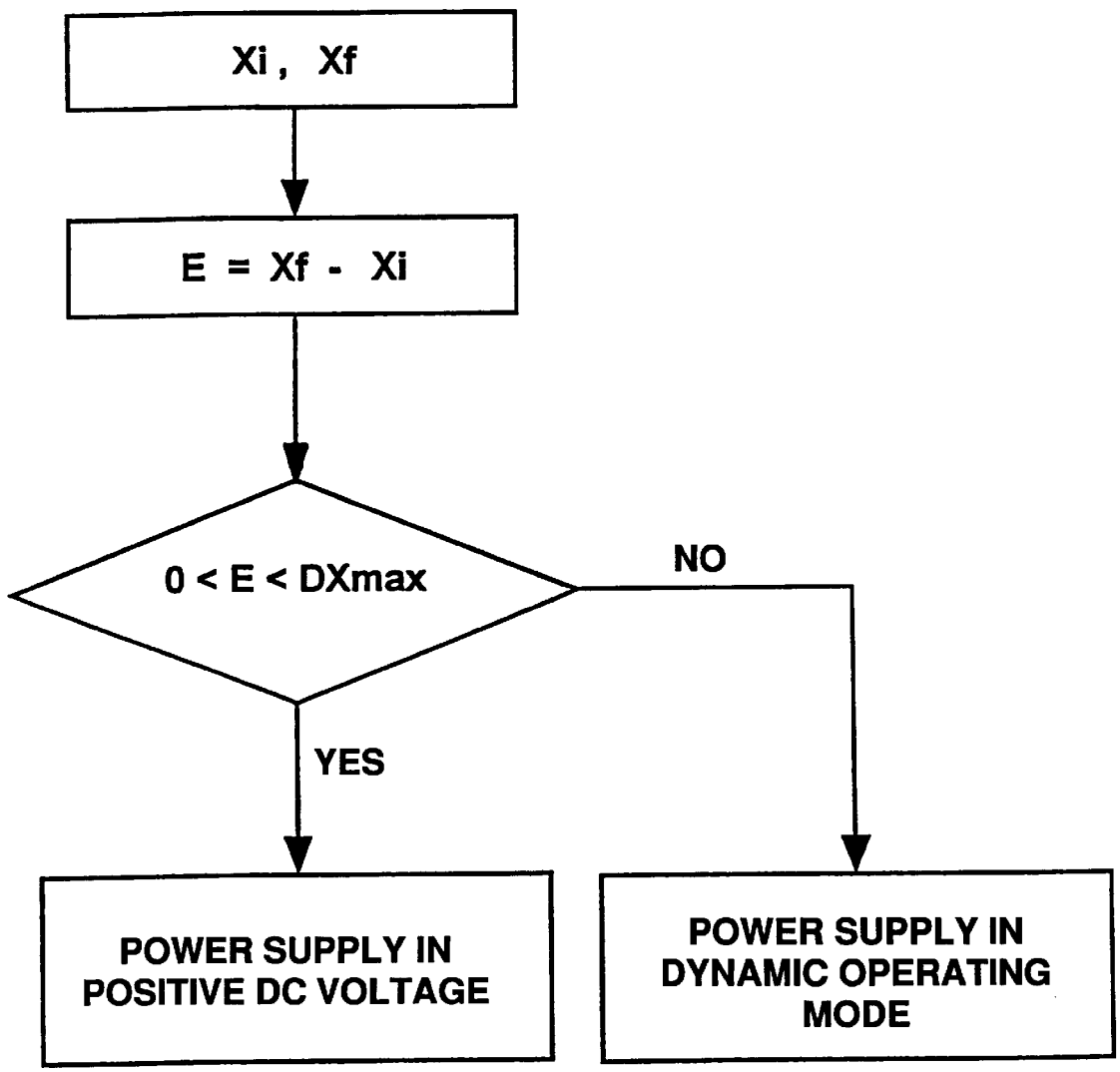
FIG. 26 shows a flowchart of a second movement control using dynamic and positive DC voltage operating modes.

FIG. 26 represents a second movement control suitable for motors having dynamic operation and direct actuator operation based on flexional deformation, for example the motor of FIG. 17. For this type of motor, it is recommended to use the dynamic operating mode to perform the longest part of the travel before switching to direct actuator operation, making use of the fact that the direct actuator movement DX is positive (DX>0) and large, as the coercive field limit of the ceramic is not reached. A positive DC voltage supply is then sufficient to perform the movement. Combined use of the first and third modes is given by the flowchart of FIG. 26 in which the signed difference E between the final position Xf and the actual position Xi of the motor is compared to DXmax representing the maximum movement in direct actuator mode, defining the positive direction of the X axis of the positions from the countermass 18 to the actuating shaft 46. So long as the signed difference E is not comprised between zero and DXmax, dynamic operating mode is used. When the signed difference E is comprised between zero and DXmax, direct actuator operating mode is used.

What is claimed is:

1. A piezoactive motor having an actuating shaft and a stator which is equipped with one or more stator modules designed, by vibrating, to cause relative movement of a driven part over a large travel by means of driving means by friction, said stator modules, by deforming, in addition enabling fine positioning of the driven part, each stator module comprising at least:

one pair of colinearly arranged piezoactive actuators electrically excited so as to deform and produce small longitudinal movements, a mechanical coupling element to which the movements of the two actuators are applied, said element being formed by a ring shaped as a shell and made of a deformable flexible material, surrounding each pair of actuators by fixing at two opposite points, wherein:

each stator module is independent from the others, is free to vibrate, and is only fixed to other parts by flexible links performing decoupling in vibration, each stator module comprises in addition a central countermass playing the role of inertia, inserted without clearance inside the shell between the piezoactive actuators and the shell, first means of deformation, in translation, are active when said piezoactive actuators are deformed longitudinally in opposition and produce a tangential movement of peaks of the shell relatively to the countermass, second means of deformation in flexion are active when said piezoactive actuators are deformed longitudinally in the same way and produce a flexion of the shell resulting in a normal movement of the peaks, the countermass remaining immobile in the centre, the mass ratio between the countermass and the shell is chosen so that in vibration in translation, the longitudinal deformations of the internal actuators generate a movement of the shell, of non-negligible amplitude with respect to that of the countermass, a combination of said first and second means is obtained when said piezoactive actuators are deformed longitudinally at the same frequency with a mechanical phase difference different from 0° or 180°, and produce a closed trajectory of the peaks usable to cause relative movement of the driven part by friction.

2. The piezoactive motor according to claim 1, wherein the ratio of the mass of the countermass (18, 26) and of the shell (20, 28) is chosen to obtain tuning of the translational and flexional modes.

3. The piezoactive motor according to claim 2, wherein at least one removable additional mass (22) fixed onto each countermass (18, 26) enables the mass ratio to be adjusted to obtain tuning of the translational and flexional modes.

4. The piezoactive motor according to claim 1, wherein the stator modules (44) are formed by two symmetrical half-modules (44A, 44B) associated to a common countermass (18) on which two pairs of piezoactive actuators (12A, 14A, 12B, 14B) are fixed in parallel, each pair being linked to a shell (20A, 20B).

5. The piezoactive motor according to claim 4, wherein the stator module (44) is placed inside a frame (50) with two fixed guide plates (52, 54) coming into engagement with the opposite peaks (A and B) of the shells (20), said plates extending parallel and symmetrically with respect to the alignment line of the piezoactive actuators (12, 14).

6. The piezoactive motor according to claim 5, wherein the guide plates (52, 54) cooperate with a clearance take-up device (56) with a flexible link performing preloading of said guide plates on the shells (20).

7. The piezoactive motor according to claim 6, wherein the actuating shaft (46) of the motor (42) is mechanically coupled to the countermass (18) by a flexible decoupling part (45), and that the clearance take-up device (56) comprises two flexion blades (58, 60) arranged in opposition on the external faces of the guide plates (52, 54).

8. The piezoactive motor according to claim 5, wherein the actuating shaft (46) of the motor (64) is directly coupled to the front of the shells (20) by means of a flexible link with flexion (66), and that the stator modules (44A, 44B) are positioned with respect to the frame (50) by means of flexible guide parts (68, 70) fixed to the frame (50) and also to the front (72) and rear (74) of the shells (20).

9. The piezoactive motor according to claim 1, wherein the stator module (24) presents a three-dimensional structure suited to a motor with two degrees of freedom comprising:

a first pair of piezoactive actuators (12A, 14A) placed colinearly on each side of the countermass (26), a second pair of piezoactive actuators (12B, 14B) arranged colinearly on each side of the countermass (26) and orthogonally to the first pair, the shell (28) comprising four branches (30, 32, 34, 36) in the form of semi-ellipses surrounding said actuators, so as to generate at the peaks (A, B) of the shell movements in three directions orthogonal to one another.

10. The piezoactive motor according to claim 9, wherein the stator module (24) is arranged inside a cup (76), and cooperates with a spring device (80, 82, 84) to form a motor with two degrees of freedom in rotation on a limited angular movement.

11. The piezoactive motor according to claim 1, wherein means for supplying the piezoactive actuators (12, 14) with DC voltage enable static movement of the actuating shaft (46) when the latter is fixed to the countermass (18) in a translational deformation.

12. The piezoactive motor according to claim 1, wherein means for supplying the piezoactive actuators (12, 14) with DC voltage enable static movement of the actuating shaft (46) when the latter is fixed to the shell (20) in a flexional deformation.

13. The piezoactive motor according to claim 1, wherein the shell (20) of the stator module (10) of the motor (99) cooperates with an angular sector (90) of a wheel (92) articulated on a spindle (94); a spring (96) being secured between the countermass (18) and a securing point (98).

14. The piezoactive motor according to claim 1, wherein the shell (20) of the stator module (10) of a linear motor (100) is linked by flexible linking means (102, 104) to a support carriage (106), which is provided with a sliding surface (108) facilitating movement of the assembly along a guide (110) in the form of a rail.

15. The piezoactive motor according to claim 1, wherein the shell (20) of the stator module (10) is linked by flexible linking means to the opposite ends of a straight guide (112) having a preset length, and extending parallel to the direction of alignment of the actuators (12, 14) to form a motor (114) with limited movement.

16. The piezoactive motor according to claim 1, wherein the stator comprises several stator modules (10A, 10B, 10C, 10D) arranged in a star-shape and cooperating with the internal cylindrical surface of a rotor (92) to drive a shaft (94) in rotation.

17. The piezoactive motor according to claim 4, wherein positioning of the actuating shaft (46) is performed by means of a movement control comprising:

means for establishing the signed difference E between the final position Xf required and the actual position Xi of the shaft (46), means for comparing the difference E with a multiple N of the maximum movement DXmax in direct actuator mode, switching from the first dynamic operating mode to the second step by step operating mode only taking place as soon as the absolute value of the difference E is less than N times DXmax.

18. The piezoactive motor according to claim 12, wherein positioning of the actuating shaft (46) is performed by means of a movement control comprising:

means for establishing the signed difference E=Xf−Xi between the final position Xf required and the actual position Xi of the shaft (46), defining the positive direction of the X axis of the positions from the countermass (18) to the actuating shaft (46), means for comparing the difference E with the maximum movement DXmax in direct actuator mode, switching from the first dynamic operating mode to the third direct actuator operating mode only taking place when the signed difference E is comprised between zero and the movement DXmax, means for supply of positive DC voltage for movement of the shaft during the third direct actuator operating mode.

* * * * *